United States Patent [19]

Kawamoto et al.

[11] Patent Number: 5,285,281
[45] Date of Patent: Feb. 8, 1994

[54] IMAGE PROCESSING APPARATUS FOR COMPRESSING IMAGE DATA AT A SELECTED COMPRESSION RATE

[75] Inventors: Sigeharu Kawamoto; Masahiro Nakanishi, both of Yokohama, Japan

[73] Assignee: Matsushita Electric Industrial Co., Ltd., Osaka, Japan

[21] Appl. No.: 920,681

[22] Filed: Jul. 28, 1992

[30] Foreign Application Priority Data

Aug. 5, 1991 [JP] Japan .................... 3-195164

[51] Int. Cl.⁵ ............................... H04N 1/353
[52] U.S. Cl. ........................... 348/578; 358/451
[58] Field of Search ................ 358/451, 180, 134; H04N 1/393

[56] References Cited

U.S. PATENT DOCUMENTS 4,729,012 3/1988 Jose et al. ............... 358/180 X
5,029,017 7/1991 Abe et al. ................ 358/451

*Primary Examiner*—Mark R. Powell
*Attorney, Agent, or Firm*—Stevens, Davis, Miller & Mosher

[57] ABSTRACT

Disclosed is a pictorial image compression device comprising an A/D converter converting an analog image input signal into digital image data, a clock dropout circuit producing a dropout indication signal and a partly dropped-out clock on the basis of a write clock and data of a selected compression rate, an averaging circuit averaging the image data according to the partly dropped-out write clock, a memory successively storing the image output data from the averaging circuit in response to the partly dropped-out write clock, a reading circuit reading out the image data stored in the memory, and a D/A converter converting the image data read out by the reading circuit into an analog signal, so that images can be continuously compressed without highlighting undesirable discontinuity at the edge of each image. Thus, the device can continuously compress image data in spite of its simple circuit structure.

6 Claims, 2 Drawing Sheets

IMAGE PROCESSING APPARATUS FOR COMPRESSING IMAGE DATA AT A SELECTED COMPRESSION RATE

BACKGROUND OF THE INVENTION

1. Field of the Invention

This invention relates to a pictorial image compression device, and more particularly to a device of the kind described above which is suitable for exhibiting a special video effect by compressing pictorial images.

2. Description of the Prior Art

A method well known in the art and commonly employed in prior art pictorial image compression devices comprises setting beforehand a plurality of specific rates of pictorial image data compression, determining one of the image data compression rates to select one of average image data corresponding to the determined image data compression rate, and writing the average image data in a memory in synchronism with a specific write clock. By the employment of such a method, the image data read out from the memory can be displayed in compressed mode.

However, in the prior art pictorial image compression device, the number of required image data averaging circuits must be equal to that of the image data compression rates, and also the number of required write clocks must be equal to that of the image data compression rates so as to successfully store the image data in the memory. Thus, the prior art device has had such a problem that, in order to achieve the objective of continuous compression of pictorial images, the circuit structure of the device becomes inevitably complex.

SUMMARY OF THE INVENTION

With a view toward solving such a prior art problem, it is an object of the present invention to provide a pictorial image compression device which can continuously compress pictorial images in spite of its simple circuit structure.

The present invention, which attains the above object, provides a pictorial image compression device comprising analog/digital converter means for converting a pictorial image input signal into digital image data in synchronism with a write clock, clock dropping-out means for dropping out the write clock according to data of a selected compression rate, averaging means for averaging the image data according to the dropped-out write clock, writing means for outputting a write instruction signal conforming to the dropped-out write clock, memory means for storing the output data from the averaging means in response to the write instruction signal, reading means for reading out the image data stored in the memory means, and digital/analog converter means for converting the image data read out by the reading means into an analog signal.

Therefore, according to the present invention, when a specific compression rate is selected, a write clock is partly dropped out according to the data of the selected compression rate, and the image data is averaged according to the partly dropped-out write clock. After each image data is averaged on the basis of the partly dropped-out write clock, the averaged image data are stored sequentially in the memory. Then, the compressed images are displayed on the basis of the image data stored in the memory without highlighting undesirable discontinuities at the edge of the displayed compressed images.

DESCRIPTION OF THE PREFERRED EMBODIMENTS

Preferred embodiments of the present invention will now be described by reference to the drawings.

Figure 1:
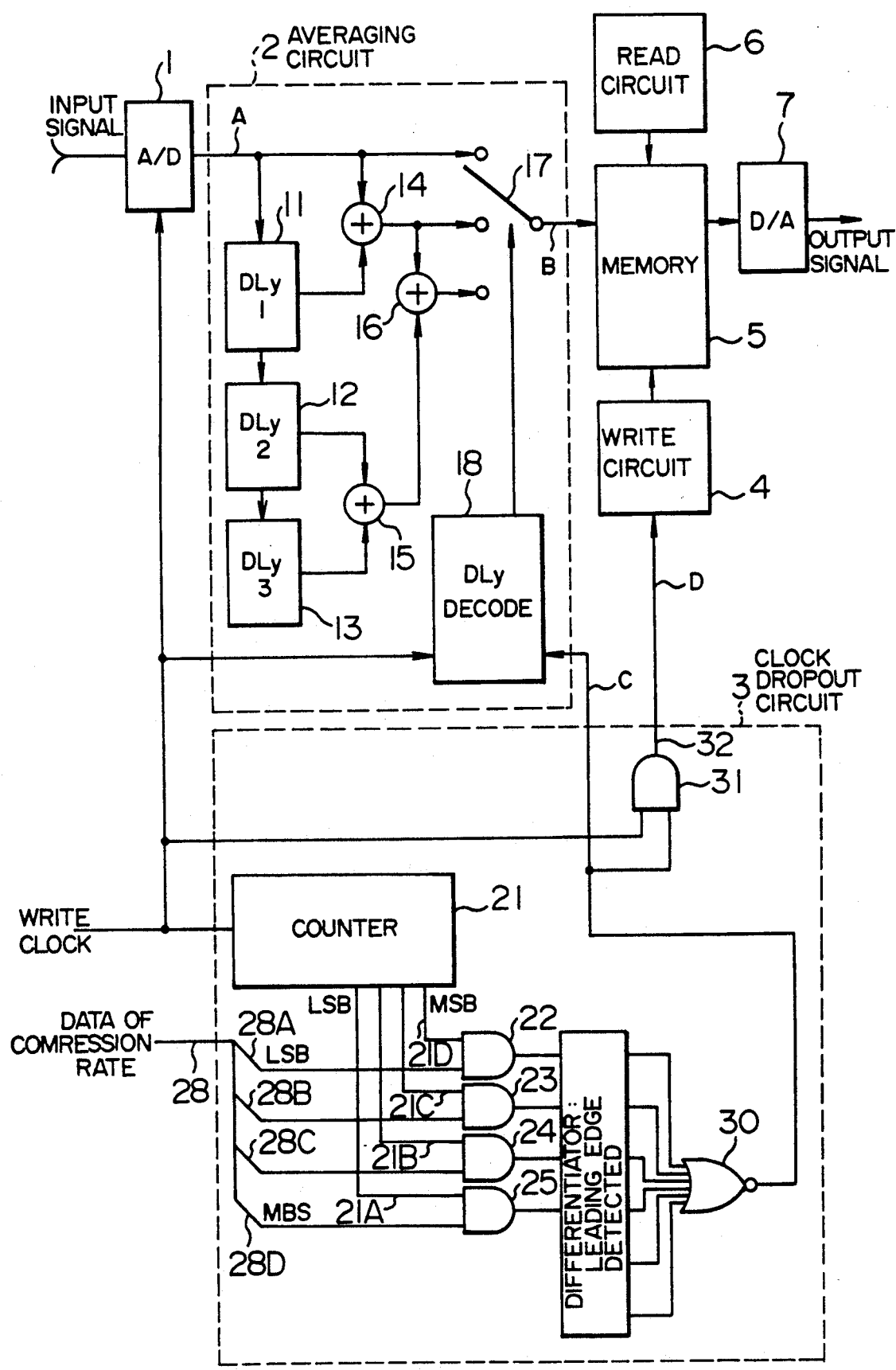
FIG. 1 is a block diagram showing the structure of an embodiment of the pictorial image compression device according to the present invention.
Figure 2:
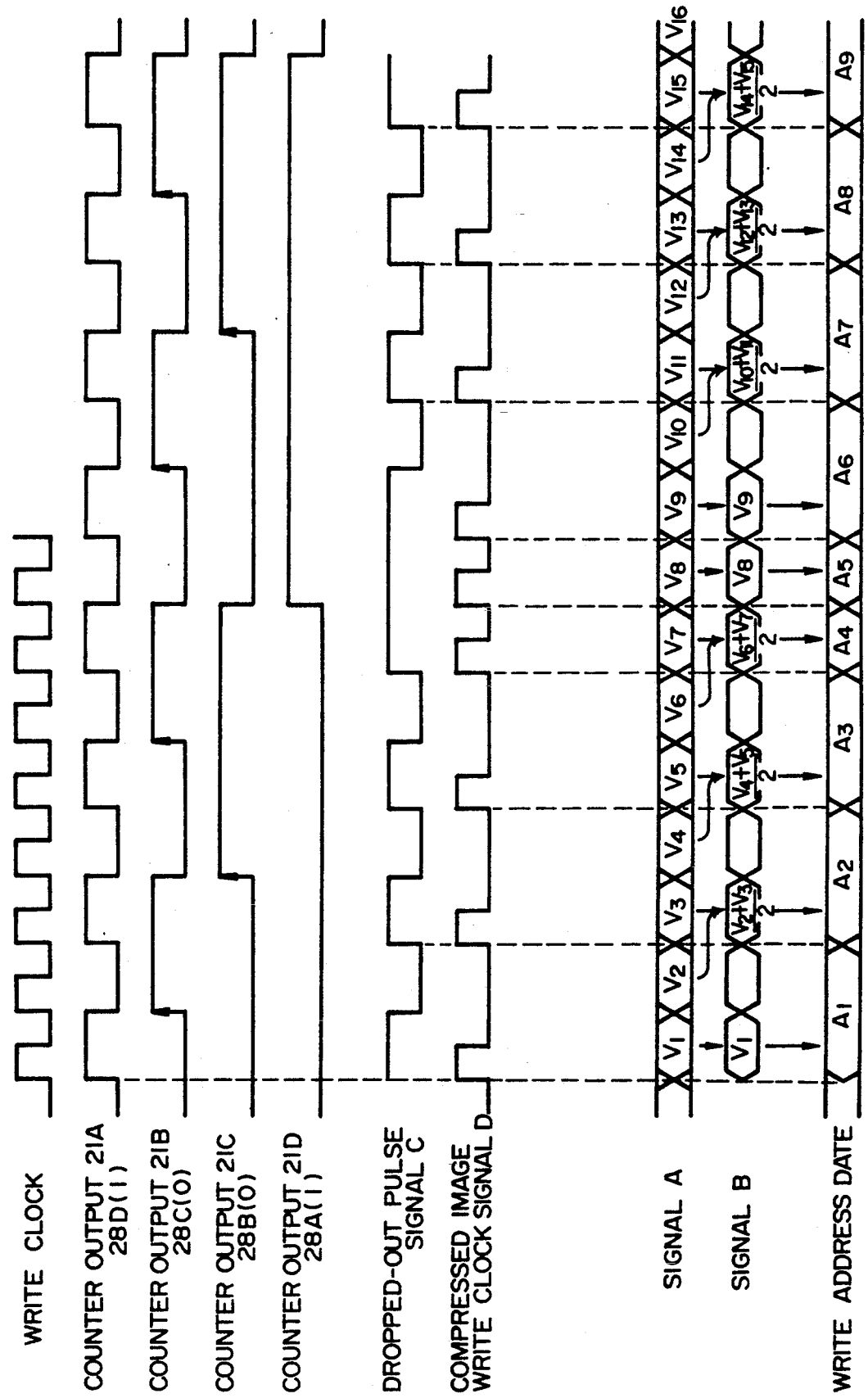
FIG. 2 is a timing chart showing the signal processing timing in the embodiment of the pictorial image compression device of the present invention.

FIG. 1 schematically shows the structure of a preferred embodiment of the pictorial image compression device of the present invention, and FIG. 2 is a timing chart showing the signal processing timing in the embodiment of the pictorial image compression device of the present invention. The structure and operation of the illustrated embodiment of the device of the present invention will now be described principally by reference to FIG. 1 while making partial reference to FIG. 2.

Referring to FIG. 1, the pictorial image compression device comprises an A/D converter 1, an averaging circuit 2, a clock dropout circuit 3, a writing circuit 4, a memory 5, a reading circuit 6 and a D/A converter 7. The A/D converter 1 acts as a means for converting a pictorial image input signal into digital image data in synchronism with a write clock, and the A/D converted image data (the signal A in FIG. 2) is supplied as an input to the averaging circuit 2. The averaging circuit 2 includes delay circuits 11, 12, 13, full adders 14, 15, 16, a switch 17 and a dropout indication signal detector circuit 18. The delay circuits 11, 12 and 13 act to successively delay the input image data by a predetermined period of time (the period of one line, that is, about 63$\mu$ sec in the case of the NTSC system), and the full adders 14, 15 and 16 act to successively average the image data and the delayed image data, delayed by the respective delay circuits 11, 12 and 13, so as to successively output the averaged image data. The dropout indication signal detector circuit 18 consists of the combination of a delay circuit and a decoder the write clock and a dropout indication signal, from the clock dropout circuit 3 are applied to this detector circuit 18. In response to the application of the dropout indication signal from the clock dropout circuit 3 together with the write clock, the detector circuit 18 detects the degree of continuity of the dropout indication signal and applies its detection output (the signal B in FIG. 2) to the switch 17. According to the input signal applied from the dropout indication signal detector circuit 18, the switch 17 selects one of the output image data appearing from the A/D converter 1, the full adder 14 and the full adder 16, so that the selected image data can be transferred to the memory 5 to be stored in the memory 5.

The clock dropout circuit 3 includes a binary counter 21, AND gates 22, 23, 24, 25, a differentiating circuit 29, a NOR gate 30 and another AND gate 31 clock drop out circuits acts as a means for dropping out part of the write clock (i.e. inhibiting certain pulses) thereby producing the dropout indication signal and the partly dropped-out write clock on the basis of the supplied write clock and the data of the selected compression rate. More precisely, the write clock applied to the binary counter 21 is subjected to frequency division, and the counter outputs (the signals 21A, 21B, 21C and 21D in FIG. 2) generated by the frequency division of the write clock ar applied to the AND gates 25, 24, 23 and 22 respectively. In addition to the counter outputs generated by the frequency division of the write clock, the data of the compression rate are supplied to these AND gates 22 to 25, respectively. The output signals of the AND gates 22 to 25 are applied to the differentiating circuit 29. The differentiating circuit 29 detects the rising edge of each of the output signals of the AND gates 22 to 25, and the detection output signals of the differentiating circuit 29 are applied to the NOR gate 30, so that this NOR gate 30 generates dropped-out clock pulse information, that is, the dropout indication signal. This dropout indication signal (the dropped-out pulse signal C in FIG. 2) is applied to both the dropout indication signal detector circuit 18 and the AND gate 31. The partly dropped out write clock (the compressed image write clock signal D in FIG. 2) representing the logical product of the supplied write clock and the dropout indication signal is applied from the AND gate 31 to the writing circuit 4.

The writing circuit 4 acts as a means for generating a write instruction signal conforming to the partly dropped-out write clock. Under control of this write instruction signal applied to the memory 5, the image data are successively stored in the specified areas of the memory 5 respectively. The reading circuit 6 acts as a means for reading out the image data stored in the memory 5, and each image data read out from the memory 5 by the reading circuit 6 is transferred to the D/A converter 7 to be converted into an analog signal.

The binary counter 21 is designed to be reset in the horizontal or vertical direction of the image and then counts up the binary code. The device is constructed so as to obtain the logical product of this binary code and the data of the compression rate, to obtain the logical product of the most significant bit (MSB) output of the binary counter 21 and the least significant bit (LSB) of the data of the compression rate and to obtain the logical product of the least significant bit (LSB) output of the binary counter 21 and the most significant bit (MSB) of the data of the compression rate. Thus, the NOR gate 30 can generate the dropout indication signal in which clock pulses corresponding to the number of the data of the compression rate are dropped out among sixteen clock pulses of a 4-bit system. The averaging circuit 2 carries out its image data averaging processing according to the partly dropped-out write clock. Therefore, because the write clock is partly dropped out, the image can be averaged according to the data of the image compression rate, so that compressed images that are quite natural and continuous can be displayed.

The timing chart shown in FIG. 2 corresponds to that of the 4-bit system, and the image compression rate is selected to compress the image by the factor of 9/16. The binary counter 21 counts up the binary code each time the write clock is applied. In the output signals 21A, 21B, 21C and 21D appearing in the above order from the binary counter 21, the signal 21A represents the least significant bit (LSB), while the signal 21D represents the most significant bit (MSB). In the case shown in FIG. 2, the data of the image compression rate of 9/16 is "9" which is "1001" according to the binary code. The bits of this binary code "1001" are allotted to the compression rate data signals 28A, 28B, 28C and 28D respectively in which the signal 28A represents the least significant bit (LSB), while the signal 28D represents the most significant bit (MSB). The compression rate data signals 28A, 28B, 28C and 28D are applied together with the counter output signals 21D, 21C, 21B and 21A to the corresponding AND gates 22, 23, 24 and 25 respectively. The output signals of these AND gates 22, 23, 24 and 25 are then differentiated by the differentiating circuit 29 and are passed through the NOR gate 30 to produce the partly dropped out pulse signal C. Then, this dropped-out pulse signal C is applied to the AND gate 31 together with the synchronous write clock to provide the compressed image write clock signal D.

On the other hand, by the image compression and averaging function of the averaging circuit 2, sixteen signals V1, V2, ..., V15 and V16 shown in FIG. 2 are averaged into nine signals. That is, the sixteen signals V1 to V16 are averaged into the nine signals by the combination of the delay circuits 11, 12, 13 and the full adders 14, 15, 16. For example, the signal V1 delayed by the period of one line by the delay circuit 11 and the delay-free signal V2 are added in the full adder 14 to be averaged into the signal "(V1+V2)/2".

In the manner described above, the image signal is averaged according to the image compression rate, and, in response to the compressed image write clock signal, write address data A1 to A9 as shown in FIG. 2 are stored in the memory 5.

The illustrated embodiment refers to the case where the number of bits of the data of the compression rate is four, and the binary counter is of the four bit type. However, it is apparent that the number of bits of both the image compression rate and the binary counter is in no way limited to the four, and any other suitable number can be used as desired. Further, although the averaging circuit 2 in the illustrated embodiment is composed of the three kinds of elements, it is apparent that the number of kinds of averaging elements may be more than that shown in FIG. 1.

It will be understood from the foregoing description of the embodiment of the present invention that an analog image signal is converted into digital image data, and the digital image data is subjected to digital processing to produce compressed image data, so that the circuit structure of the device can be greatly simplified.

We claim:

1. A pictorial image compression device comprising:

analog/digital converter means for converting a pictorial image input signal into digital image data in synchronism with a first write clock having first pulses;

compression clock generating means for generating a compression write clock which includes second pulses and which corresponds to said first write clock except that during at least one predetermined time period, a number of said second pulses is less than a number of said first pulses, according to a selected compression rate;

averaging means for averaging the image data according to the compression write clock;

writing means for outputting a write instruction signal conforming to the compression write clock;

memory means for storing the output data from said averaging means in response to the write instruction signal;

reading means for reading out the image data stored in said memory means; and digital/analog converter means for converting the image data read out by said reading means into an analog signal.

2. A pictorial image compression device according to claim 1, wherein said compression clock generating means includes a counter for dividing the frequency of the first write clock to generate output signals having respectively different frequencies and gate circuits for gating the output signals of said counter and data of the selected compression rate.

3. A pictorial image compression device according to claim 1, wherein said averaging means includes delay circuits for delaying the image data by a predetermined period of time and full adder circuits for adding the output signals of said delay circuits to said image data.

4. A pictorial image compression device according to claim 3, wherein the delay time of said delay circuits is selected to be equal to the period of one line.

5. A pictorial image compression device according to claim 1, wherein said averaging means averages the image data for a selected period which is determined by said compression write clock.

6. A pictorial image compression device comprising:
analog/digital converter means for converting a pictorial image input signal into digital image data in synchronism with a first write clock having first pulses;
compression clock generating means including means for generating a compression write clock, having second pulses, in response to said first pulses of said first write clock and means for inhibiting generation of selected ones of said second pulses in accordance with a selected compression rate such that during a predetermined time period, a number of said second pulses is less than a number of said first pulses;
averaging means for averaging the image data according to the compression write clock;
writing means for outputting a write instruction signal conforming to the compression write clock;
memory means for storing the output data from said averaging means in response to the write instruction signal;
reading means for reading out the image data stored in said memory means; and
digital/analog converter means for converting the image data read out by said reading means into an analog signal.

* * * * *